Figure 1:
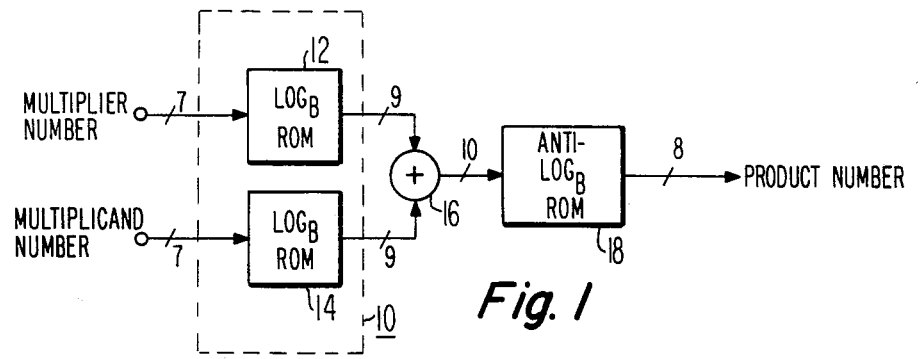

United States Patent [19]

Lewis, Jr. et al.

[11] Patent Number: 4,555,768
[45] Date of Patent: Nov. 26, 1985

[54] DIGITAL SIGNAL PROCESSING SYSTEM EMPLOYING LOGARITHMS TO MULTIPLY AND DIVIDE

[75] Inventors: Henry G. Lewis, Jr., Hamilton Square; Thomas M. Stiller, Ewing Township, Mercer County, both of N.J.

[73] Assignee: RCA Corporation, Princeton, N.J.

[21] Appl. No.: 502,014

[22] Filed: Jun. 7, 1983

[51] Int. Cl.$^4$ .............................................. G06F 7/52
[52] U.S. Cl. .................................... 364/757; 364/764
[58] Field of Search ................ 364/757, 764; 235/310

[56] References Cited

U.S. PATENT DOCUMENTS

| | | | |
|---|---|---|---|
| 4,078,250 | 3/1978 | Windsor et al. ..................... | 235/310 |
| 4,191,995 | 3/1980 | Farrow ............................... | 364/113 |
| 4,303,912 | 12/1981 | Stafford et al. ..................... | 340/703 |
| 4,346,402 | 8/1982 | Pugsley ............................... | 358/80 |
| 4,366,549 | 12/1982 | Katayama ........................... | 364/757 |

OTHER PUBLICATIONS

T. Brubaker et al, "Multiplication Using Logarithms Implemented with Read-Only Memory", *IEEE Transactions on Computers*, vol. C-24, No. 8, Aug. 1975, pp. 761-765.
E. Hall et al, "Generation of Products and Quotients Using Approximate Binary Logarithms for Digital Filtering Applications", *IEEE Transactions on Computers*, vol. C-18, No. 2, 2/1970, pp. 97-105.
R. Kupnicki, "Software-Based Digital Signal Processing", *Digital Video, (SMPTE)*, vol. 3, Jun. 1980, pp. 89-98.
Rabiner et al, Theory and Application of Digital Signal Processing, Prentice-Hall, Inc., 1975, Section 8.6, "Multipliers", pp. 514-525.
Mitchell, Jr., "Computer Multiplication and Division Using Binary Logarithms", *IRE Trans. on Electronic Computers*, Aug. 1962, pp. 512-517.
Krishnamurthy, "On Computer Multiplication and Division Using Binary Logarithms", *IEEE Trans. on Electronic Computers*, Jun. 1963, pp. 319-320.
Marconi Electronics Inc., "Line Array Telecine B3410", No. TD-3-B3410, 1982.
Edgar et al, "FOCUS Mircrocomputer Number System", *Communications of the ACM*, vol. 22, No. 3, Mar. 1979, pp. 166-177.
Kingsbury et al, "Digital Filtering Using Logarithmic Arithmetic", *Electronics Letters*, vol. 7, No. 2, Jan. 28, 1971, pp. 56-58.
Gorder et al, "Big, Fast and Simple-Algorithms, Architecture and Components for High-End Superminis", Monolithic Memories Application Note AN-111, Apr. 1982.
Fremont, "Digital Video Processing for Telecine", *Communication & Broadcasting*, vol. 8, No. 2, Feb. 1983, pp. 35-40.
Matchell, "Digital Signal Processing for the Marconi Line Array Telecine", Montrevx Record 1983, pp. 487-496.
Matchell, "The Marconi B3410 Line-Array Telecine", *Communication & Broadcasting*, vol. 7, No. 2, Feb. 1982, pp. 33-38.
Matchell, "The Marconi B3410 Line Array Telecine", *SMPTE Journal*, Nov. 1982, pp. 1066-1070.

*Primary Examiner*—David H. Malzahn
*Attorney, Agent, or Firm*—Eugene M. Whitacre; Paul J. Rasmussen; Clement A. Berard, Jr.

[57] ABSTRACT

A digital signal processing system applies numbers to the multiplied or divided to address a memory storing a logarithm table to produce the logarithms of the numbers. These logarithms are added for multiplication or substracted for division to produce the logarithm of the result number which is applied to address a memory storing an antilogarithm table to produce the result number. The base of the logarithms is selected in accordance with the magnitudes of the numbers to be multiplied or divided so as to utilize substantially the entire range of magnitudes of the digital representation of the logarithms.

20 Claims, 4 Drawing Figures

DIGITAL SIGNAL PROCESSING SYSTEM EMPLOYING LOGARITHMS TO MULTIPLY AND DIVIDE

The present invention relates to a digital signal processing system employing logarithms to multiply and divide digital numbers.

In the processing of digital signals it often becomes necessary to perform multiplication and division operations which require digital multipliers and digital dividers. Most hardware direct multipliers operate using a series of shifting and adding operations in which the product is the result of a sequence of many such operations. Such multipliers are undesirably complex and costly, especially where high-speed multiplication is required. Direct multipliers can operate using a table-look-up operation implemented using a read-only memory (ROM) which stores a table of values corresponding to the product of the digital numbers applied as addressing words. Because the number of bits which must be stored is very large, direct ROM-based multipliers also tend to be complex and costly.

One approach to reducing the ROM storage capacity required is to use logarithms to perform the multiplication operation as follows. The logarithms of the mulitplicand and of the multiplier are looked up in ROMs which store tables of logarithms, and are added to produce the logarithm of the product. The product is then looked-up in a ROM which stores a table of antilogarithms.

Arrangements of the sorts described above are described, for example, in T. A. Brubaker et al, "Multiplication Using Logarithms Implemented with Read-ONly Memory", *IEEE TRANSACTIONS ON COMPUTERS*, Vol. C-24, No. 8, Aug. 1975, pages 761-65. Brubaker et al show in FIG. 8 that the accuracy of the product improves (i.e. error "e" maximum decreases) as the number of bits of the logarithm is increased. But, increasing the number of bits to improve accuracy only serves to increase the size of the ROMs, and therefore their complexity and cost. Similar problems of complexity, speed and cost are encountered for digital dividers, even those employing ROMs and logarithms.

Thus, there is a need for a multiplication and division system which will reduce the number of bits of the logarithm so as to reduce the size of the memories required to achieve a given level of accuracy or, alternately, which will improve the accuracy of the product obtainable with a given number of bits in the logarithm.

Accordingly, the signal processing system of the present invention comprises a first memory producing N-bit logarithms to a base B of numbers to be processed and a processor for digitally processing those logarithms. A second memory produces the result number from the antilogarithm to the base B of the sum of the logarithms. The base B is selected to utilize substantially the entire range of possible magnitudes of the N-bit logarithms.

Figure 3:
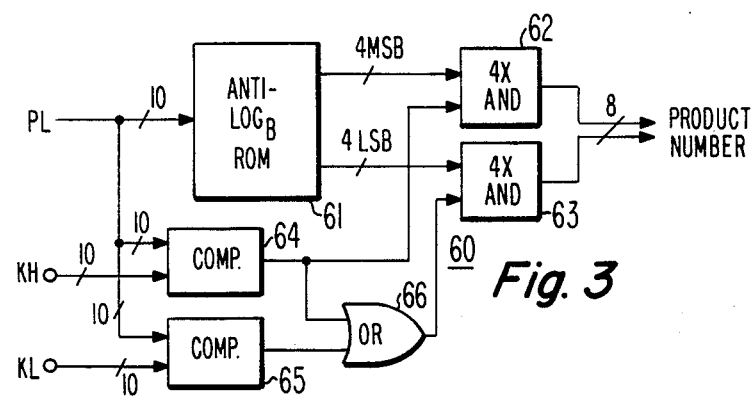
Figure 2:
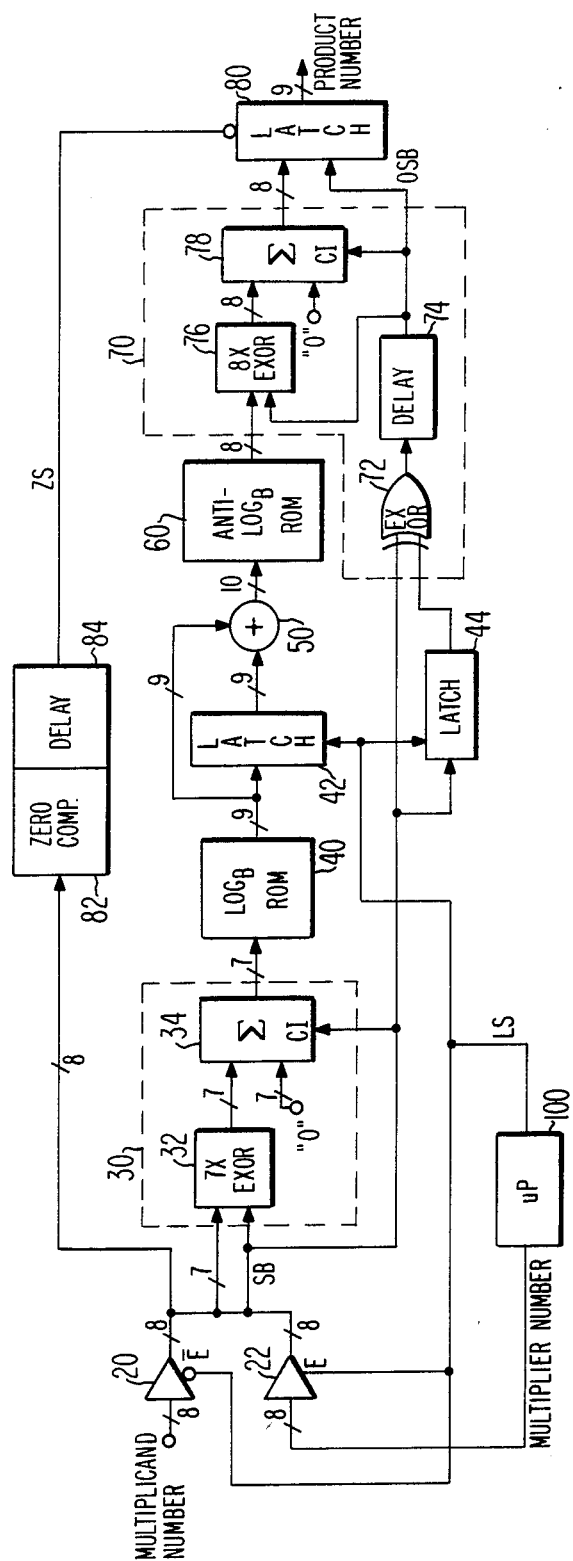
Figure 4:
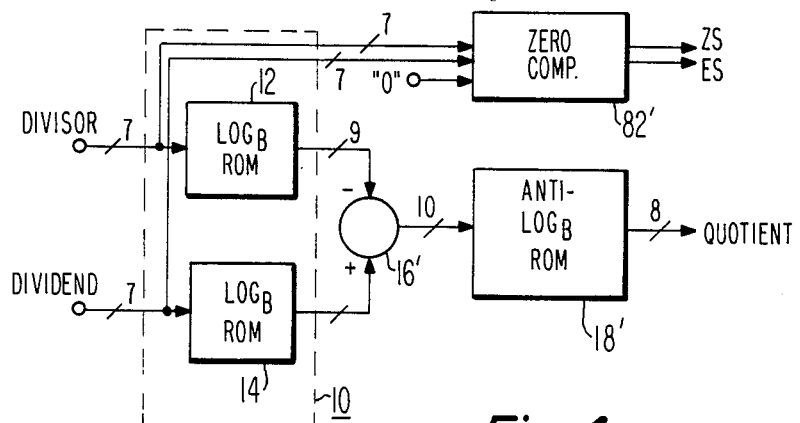

In the Drawing:

FIGS 1, 2 and 4 are schematic diagrams in block diagram form of embodiments of signal processing systems including the present invention; and FIG 3 is a schematic diagram in block diagram form of an alternative embodiment of a portion of the system of FIGS. 1, 2 or 4.

In the drawing, line arrows represent multiple-bit parallel digital signals having the numbers of bits indicated by the numerals proximate the slash marks thereon; no slash marks are used for single-bit digital signals. As used herein, the two numbers to be processed are designated as multiplier and multiplicand for multiplication operations and as dividend and divisor for division operations.

In the processing system of FIG. 1, a memory 10 includes ROMs 12 and 14. For multiplication, a seven-bit digitial multiplicand number is applied to the address input of ROM 12 which produces, from a table of logarithms to the base "B" stored therein, a nine-bit digital logarithm of the multiplicand number. A seven-bit digital multiplier number is applied to the address input of ROM 14 which produces, from a table of logarithms to the base "B" stored therein, a nine-bit digital logarithm of the multiplier number. Digital combiner 16 receives the digital logarithms of the multiplicand and multiplier numbers and additively combines them to produce the sum thereof, which is the digital logarithm to the base "B" of the product number. The ten-bit logarithm of the product number is applied to the address input of ROM 18 which produces, from a table of antilogarithms to the base "B", an eight-bit product number.

Specifically, the base B to which logarithms are taken is selected to obtain high accuracy by maximizing the use of the available bits of the digital logarithm. For an N-bit logarithm, the N-bit digital logarithm signal can have all values between zero and $2^N-1$, inclusive. The base B is selected so that the digital logarithm utilizes substantially the entire range of values of zero to $2^N-1$. Thus, when two M-bit numbers are to be multiplied:

$$\text{Log}_B 1 = 0 \tag{1}$$

and $$\text{Log}_B [(2^M-1)(2^M-1)] = 2^N-1 \tag{2}$$

so that $$B = \text{antilog}_{10}\{[2/(2^N-1)] \log_{10}(2^M-1)\} \tag{3}$$

By way of example, consider the multiplication of two seven-bit numbers (i.e. M=7) using a logarithm having nine bits (i.e. N=9). In this example, therefore, $$B = \text{antilog}_{10}[(2/511) \log_{10}(127)] \tag{4}$$

$$B = 1.01914 \tag{5}$$

Table I following shows the preferred values of the base B for varius bit lengths of numbers to be multiplied and of the logarithms, calculated in accordance with equation (3).

TABLE I

| NUMBER OF BITS IN LOGARITHMS | N = 8 | N = 9 | N = 10 |
|---|---|---|---|
| NUMBER OF BITS OF MULTIPLIER AND MULTIPLICAND | | | |
| M = 6 | 1.03303 | 1.01635 | 1.00813 |
| M = 7 | 1.03872 | 1.01914 | 1.00952 |
| M = 8 | 1.04442 | 1.02192 | 1.01089 |

It is noted that the value of base B increases as the number of bits M of the multiplier and multiplicand numbers increase, and decreases as the number of bits N of the logarithm increases.

By way of comparison, conventional logarithmic multiplying systems employ the conventional bases, i.e. bases of two, ten or the natural base e=2.71828. These bases produce additional errors because the full range of logarithmic values are not utilized. A direct comparison of multiplication accuracy is made in the Tabel II below in which the distribution of errors is listed for exemplary logarithm bases. The numbers listed in the columns indicate the numbers of products which are within the listed accuracy of the exact product. Each represents a multiplication of two seven-bit numbers producing a product using logarithms having the numbers of bits indicated. It is noted that multiplication of two seven-bit numbers produces a fourteen-bit product, however, in the described embodiment, the six least significant bits thereof are truncated and rounded to produce an eight-bit product number.

TABLE II

| Errors: (Bit Values) | −4 | −3 | −2 | −1 | 0 | 1 | 2 | 3 | 4 |
|---|---|---|---|---|---|---|---|---|---|
| Nine-bit Logarithm to Base B: | 7 | 60 | 224 | 1205 | 5342 | 1102 | 157 | 27 | 4 |
| Ten-bit Logarithm to Base B: | 0 | 0 | 40 | 955 | 6245 | 853 | 35 | 0 | 0 |
| Nine-bit Logarithm to Base 2: | 187 | 353 | 688 | 2631 | 2902 | 695 | 260 | 113 | 57 |

In each line entry in Table II, the cases where either the multiplicand or the multiplier is zero are eliminated, as are the negative products, so that the total number of products is NP=$\frac{1}{2}(2^{2M}-2^M)$. Thus, for the multiplication of two seven-bit numbers, NP=8128. In other words, for nine-bit logarithms using the base B selected as described herein, about 66% of the products are within the accuracy of the least significant bit (LSB) of the product number and all are concentrated within four LSBs thereof. This result improves to about 75% and all concentrated within two LSBs thereof when a ten-bit logarithm is employed. In contrast, using the base two, for example, only 36% are within one LSB accuracy and some products have errors greater than four LSB.

The products produced by employing the present invention, therefore, are of substantially improved accuracy relative to that obtained with base two logarithms, for equal bit-length logarithms. Alternatively, for a given level of accuracy, the advantage of the present invention can be used to reduce the storage capacity of the ROMs employed, and therefore, reduce the complexity and cost of the multiplication system.

The processing system of FIG. 2 is arranged for multiplying two's complement numbers and to further reduce the storage capacity of the ROM storing the table of logarithms. A two's complement multiplier number is provided, for example, by microprocessor 100 to tri-state buffer 22 and a two's complement multiplicand number is applied to tri-state buffer 20. Microprocessor 100 further supplies a timing pulse identified as latch signal LS. Signal LS is produced, for example, during the vertical blanking interval of a television signal when the arrangement of FIG. 2 is employed to multiply digital television signals in a television receiver. In the following description, the multiplication operation will first be described. Thereafter, the manner in which the sign bit OSB of the product is developed and the manner in which a multiplier or multiplicand value of zero is responded to will be described.

When latch signal LS at the enable input E of tri-state buffer 22 is high, the multiplier number is applied thereby to complementing circuit 30 which receives that number as seven-bits and a sign bit SB. Because the not-enable input $\overline{E}$ of tri-state buffer 20 is high at this time, its output is substantially an open circuit.

Two's complementing circuit 30 receives a seven-bit two's complement number and its sign bit SB and produces a seven-bit binary number of equivalent magnitude but without sign. Complementing circuit 30 includes, for example, EXOR circuit 32 which includes seven exclusive-OR gates each receiving a respective one of the seven bits at a first input and each receiving the sign bit at a second input thereby inverting each bit if and only if the sign bit indicates a negative sign (i.e. is a logical one). Digital adder 34 receives the seven-bit output number from EXOR circuit 32 and, in addition to adding a zero number thereto, adds a one thereto via its carry-bit input CI if and only if the sign bit indicates a negative sign. Adder 34 applies the complemented multiplier number to the address input of logarithm ROM 40.

ROM 40, which stores a table of logarithms to the base B, develops the nine-bit logarithm of the multiplier number which is stored by latch 42 in response to latch signal LS, and which is applied to a first input of digital adder 50. Latch 42 is, for example, a nine-bit storage register. The multiplier coefficient is now loaded, i.e. its logarithm is stored in latch 42, and the multiplier system is ready to receive multiplicand numbers upon latch signal LS changing state.

When latch signal LS becomes a low level, tri-state buffer 20 is enabled, the eight-bit two's complement multiplicand number is applied to complementing circuit 30 and thence to logarithm ROM 40 which produces the nine-bit logarithm thereof to the base B, as described above. Adder 50 sums the nine-bit logarithms of the multiplier number applied from latch 42 and the multiplicand number applied from ROM 40 to develop the ten-bit logarithm of the product number which is applied to the address input of antilogarithm ROM 60.

ROM 60, which stores a table of antilogarithms to the base B, develops an eight-bit unsigned product number which is applied to two's complementing circuit 70. EXOR circuit 76 and digital adder 78 of complementing circuit 70 respond to the unsigned product number and to the output sign bit OSB to develop in output latch 80 a nine-bit signed two's complement product number. It is important to note that because the base B is selected so that the full range of nine-bit logarithm values are utilized, the full range of ten-bit product logarithm values are also utilized thereby making efficient use of the address bits of ROM 60. EXOR circuit 76 and adder 78 of complementing circuit 70 operate in similar fashion to complementing circuit 30 described above.

Product sign bit OSB is developed as follows. Concurrently with developing the logarithm of the multiplier number, the sign bit SB thereof is applied to and stored by latch 44 in response to lach signal LS. EXOR gate 72 of complementing circuit 70 receives the sign bit of the multiplier number from buffer 20. EXOR gate 72 develops a positive sign bit (i.e. a zero-level bit) if the two input sign bits are the same level and develops a negative sign bit (i.e. a one-level bit) if the two input sign bits are different. Delay device 74 delays the sign bit produced by EXOR 72 so that it is applied to EXOR circuit 76 and adder 78 coincident in time with the product number to which it corresponds. In other words, delay device 74 increases the propogation delay of the sign bit result to substantially equal that of the multiplication operation performed by complementing circuit 30, ROM 40, adder 50 and ROM 60.

As thus far described, the multiplication system of FIG. 2 may respond improperly for multiplier numbers or multiplicand numbers which are zero-valued. This is because the logarithm of zero is undefined. To overcome this limitation, the multiplier and multiplicand numbers produced by buffers 20 and 22 are applied to zero comparator 82. Comparator 82 detects the condition that either one or both of the multiplier or multiplicand numbers is zero and produces a zero indicating signal ZS indicating such condition. Comparator 82 includes a delay device 84 to delay signal ZS so that it is applied to latch 82 coincident with the product number produced by complementing circuit 30, ROM 40, adder 50, ROM 60 and complementing circuit 70 in response to the zero-valued multiplier or multiplicand number. Zero signal ZS is applied to output latch 82 to force its output to be a zero-valued two's complement number thereby producing a proper zero-valued product number in response to a zero-valued input number. It is understood that comparator 82 and delay 84 are not necessary where the multiplier and multiplicand numbers are never zero.

FIG. 3 is an alternative arrangement of antilogarithm memories 18 and 60 in which the number of storage cells is substantially reduced. Because the product number is truncated to eight-bits, many low-valued product numbers will be zero-valued. These product numbers are developed when the product logarithm PL produced by adder 50 is less than a given value designated KL. In addition, other products will have values such that, for example, the four most significant bits (MSB) of the product number will be zero-valued. These product numbers are developed when the product logarithm PL is less than a second given value designated KH, wherein KH is greater than KL. In the arrangement of FIG. 3, antilogarithm ROM 61 need include only eight-bit storage cells corresponding to addresses greater than KH and four-bit storage cells corresponding to addresses between KH and KL; there need be no storage cells corresponding to addresses less than KL.

Comparator 64 detects the condition PL>KH for which a more-than-four-bit product number is to be developed and produces a one-level output which is coupled to 4× AND circuit 62 and to 4× AND circuit 63 via OR gate 66. AND circuit 62 includes four AND gates having respective first inputs to which ones of the four MSB signals developed by ROM 61 are applied and having second inputs to which the output from comparator 64 is applied. AND circuit 63 similarly includes four AND gates having respective first inputs to which ones of the four LSB are applied and having second inputs to which the output from OR gate 63 is applied. Thus, when PL exceeds KH, comparator 64 enables AND circuits 62 and 63 to produce the eight bits developed by ROM 61 as the product number.

Comparator 65 detects the condition PL>KL for which a non-zero product number is to be developed, and produces a one-level output which is coupled to 4× AND circuit 63 via OR gate 66 thereby to enable AND circuit 63 to produce the four LSB produced by ROM 61 as the four LSB of the product number. When PL is between KH and KL, comparator 64 produces a zero-level output causing AND circuit 62 to produce zeros in the four MSB positions of the product number. When PL is less than KL, comparator 64 causes AND circuit 62 to produce zeros in the four MSB positions and comparators 64 and 65 cause AND circuit 63 to produce zeros in the four LSB positions, thereby producing a zero-valued product number.

The feature of the present invention reducing the complexity of digital multiplication and division systems provides particular advantage in digital processing systems which are embodied in integrated circuits wherein reduced complexity reduces integrated circuit area which results in lower cost and improved yield. Integrated circuits for digitally processing television luminance and chrominance signals are examples of such digital processing systems because they can require several multiplication or division systems to, for example, change digital luminance signal magnitudes to control contrast and change digital chrominance signal magnitudes to control color saturation or tint.

FIG. 4 is an alternative embodiment of the arrangement of FIG. 1 adapted for performing a division operation. The divisor number is applied to address ROM 12 and the dividend number is applied to address ROM 14 which apply the logarithms to the base B thereof to combining circuit 16'. Combining circuit 16' subtracts the logarithm of the divisor from that of the dividend to develop nine-bits of the logarithm to the base B of the quotient. In addition, combiner 16' develops a carry bit indicating whether the difference is positive or negative. The ten-bit quotient logarithm (nine bits and the carry bit) is applied to address antilogarithm ROM 18' which produces an eight-bit quotient number.

It is understood that the quotient is zero when the dividend is zero and is undefined when the divisor is zero. These conditions are detected by zero comparator 82' which produces a zero indicating signal ZS when the dividend is zero and produces an error indicating signal ES when the divisor is zero. In addition, the arrangement of FIG. 4 can include complementing circuits similar to circuit 30 preceeding ROMs 12, 14 and similar to circuit 70 following ROM when other than binary numbers are to be processed, and can include output sign bit developing circuits similar to circuits 72, 74 when signed numbers are to be processed.

Modifications to the present invention are contemplated within the scope of the claims following. For example, the base B can be selected to utilize substantially the full range of its possible values for N bits using approximate relationships rather than that of equation (3) above. Satisfactory relationships can include, for example, $$B \cong \text{antilog}_{10} [(2/2^N) \log_{10} (2^M - 1)] \tag{6}$$

or $$B \cong \text{antilog}_{10} [(2/2^N) \log_{10} (2^M)] \tag{7}$$

Where an M-bit multiplier number and a P-bit multiplicand number are employed, the base B is approximately $$B = \text{antilog}_{10} \{[1/(2^N-1)] \log_{10} [(2^M-1)(2^P-1)]\}. \quad (8)$$

Similarly to the previous paragraph, other substantially similar relationships can also be employed, e.g., $$B \cong \text{antilog}_{10} [(\tfrac{1}{2}^N) \log_{10} (2^{M+P})] \quad (9)$$

By way of further example, the signal processing system of the present invention can be a fractional multiplicaton system, e.g. one in which the multiplier number is not greater than unity. For an eight-bit, two's complement multiplier of the sort shown in FIG. 2, the multiplier number value is between $-127$ and $+127$. To provide a fractional multiplication system, multiplication numbers between $-127/128$ and $+127/128$ are employed and are simply and conveniently implemented by adjusting the values of the antilogarithms stored in ROM 60 to account for the factor 1/128.

It is noted that the arrangement of FIG. 2 can be modified to process binary numbers by removing complementing circuits 30 and 70. It is further noted that the arrangement of FIG. 1 described for multiplication operations can be employed for division operations by modifying the logarithms stored in ROM 12 to be the logarithm to the base B of the reciprocal of the address number rather than that of the address number itself.

The cooperation between tri-state buffers 20 and latch 42 provides time sequenced or multiplexed processing of the multiplier and multiplicand numbers through ROM 40. Other forms of multiplexers and demultiplexers are equally satisfactory to serially process numbers through logarithm ROM 40 of FIG. 2 or through logarithm ROMs 10, 12 of FIG. 1.

Still further, the signal processing system of the present invention can be employed as a squaring circuit or as a square-rooting circuit. The arrangement of FIG. 1 is modified in that memory 10 includes only logarithm ROM 12 and combiner 16 is replaced by a shifting device which shifts the bits of the logarithm produced by ROM 12 one place to the left (i.e. to greater bit weight positions) for squaring and one place to the right (i.e. to lesser bit weight positions) for square rooting.

What is claimed is:

1. A digital signal processing system for processing digital numbers to produce processed digital numbers comprising:

first memory means for producing N-bit logarithms of said input digital numbers from a table of N-bit logarithms to a base B stored therein;

processing means coupled to said first memory means for digitally processing the N-bit logarithms of said inout digital numbers to produce processed N-bit logarithms; and second memory means for producing from a table of antilogarithms to said base B stored therein said processed digital numbers in response to said processed N-bit logarithms;

wherein said base B is selected in accordance with the magnitudes of said processed digital numbers to utilize substantially the entire range of possible magnitudes of said N-bit logarithms.

2. A digital signal processing system for processing a first number and a second number to produce a result number comprising:

first memory means for producing N-bit logarithms of said first and said second numbers from a table of N-bit logarithms to a base B stored therein;

combining means coupled to said first memory means for combining the N-bit logarithms of said first and said second numbers; and second memory means including a table of antilogarithms to said base B for producing said result number in response to said combination of the N-bit logarithms of said first and said second numbers, wherein said base B is selected in accordance with the magnitudes of said result numbers to utilize substantially the entire range of possible magnitudes of said N-bit logarithms.

3. The system of claim 2 wherein said first and second numbers are a multiplier number and a multiplicand number and have M and P bits, respectively, and wherein said selection of said base B in accordance with the magnitudes thereof is approximately given by $$B = \text{antilog}_{10} \{[1/(2^N-1)] \log_{10} [(2^M-1)(2^P-1)]\}.$$

4. The system of claim 2 wherein said first memory means includes a digital memory having an address input to which said first number and said second number are applied, having an output at which said N-bit logarithms are produced, and having a plurality of addressable cells in which said table of logarithms is stored, each said addressable cell storing the logarithm to said base B of the address thereof.

5. The system of claim 4 wherein said first memory means further includes multiplexing means for sequentially applying said first member and said second number to the address input of said digital memory, and storage means coupled to the output of said digital memory for storing the logarithm of one of said first and said second numbers produced thereby.

6. The system of claim 5 wherein said combining means has a first input coupled to said storage means for receiving said logarithm stored thereby and has a second input coupled to the output of said digital memory means for receiving the logarithm of the other of said first and said second numbers produced thereby.

7. In the system of claim 2 wherein said first and said second numbers include a sign bit, said system further comprising first means to which said sign bits of said first and said second numbers are applied for developing a sign bit of said result number, and means, coupled to said second memory means and to said first means, for converting said result number to a signed result number.

8. The system of claim 2 wherein said second memory means includes a digital memory having an address input to which said combination of the logarithms is applied, having an output at which result numbers are produced, and having a plurality of addressable cells in which said table of antilogarithms is stored, each said addressable cell storing the antilogarithm to said base B of the address thereof.

9. The system of claim 8 wherein the number of said plurality of addressable cells corresponds to a portion of the range of possible magnitudes represented by said combination of the logarithms, and wherein said second memory means includes comparing means responsive to said combination of said logarithms for detecting the magnitudes thereof being outside of said portion of the range, and gating means for selectively producing said result numbers produced at the output of said digital memory and a predetermined result number in response to said detecting by said comparing means.

10. The system of claim 2 wherein said second memory means further includes comparing means to which said first and said second numbers are applied for detecting a zero magnitude thereof, and means, coupled to said table of antilogarithms and to said comparing means, for producing said result numbers having zero magnitude in response to said detecting by said comparing means.

11. A digital signal processing system for multiplying a multiplier number and a multiplicand number to produce a product number comprising:
first memory means for producing N-bit logarithms of said multiplier and said multiplicand numbers from a table of N-bit logarithms to a base B stored therein;
combining means coupled to said first memory means for adding the N-bit logarithms of said multiplier number and said multiplicand number; and
second memory means for producing from a table of antilogarithms to said base B stored therein said product number in response to the sum of the N-bit logarithms of said multiplier and said multiplicand numbers produced by said combining means,
wherein said base B is selected in accordance with the magnitudes of said product numbers to utilize substantially the entire range of possible magnitudes of said N-bit logarithms.

12. A digital signal processing system for dividing a dividend number by a divisor number to produce a quotient number comprising:
first memory means for producing N-bit logarithms of said dividend and said divisor numbers from a table of N-bit logarithms to a base B stored therein;
combining means coupled to said first memory means for subtracting the N-bit logarithm of said divisor number from that of said dividend number; and
second memory means for producing from a table of antilogarithms to said base B stored therein said quotient number in response to the difference of the N-bit logarithms of said dividend and said divisor numbers,
wherein said base B is selected in accordance with the magnitudes of said differences to utilize substantially the entire range of possible magnitudes of said N-bit logarithms.

13. A digital signal processing system for multiplying a multiplier number and a multiplicand number to produce a product number comprising:
first addressable memory means for producing N-bit logarithms of said multiplier and said multiplicand numbers, including a plurality of addressable cells storing logarithms corresponding to the logarithms to a base B of the addresses thereof, said base B being selected dependent on the maximum possible magnitudes of said product numbers to utilize substantially the entire range of magnitudes of said N-bit logarithms;
multiplexing means for sequentially applying said multiplier and said multiplicand numbers to said first addressable memory means;
storing means coupled to said first addressable memory means and cooperating with said multiplexing means for storing the logarithms to said base B of one of said multiplier and said multiplicand numbers;
adding means coupled to said storing means and to said first addressable memory means, for summing said logarithms of said mutliplier and said multiplicand numbers produced by said storing means and by said first addressable memory means; and
means including a second addressable memory means, coupled to said adding means, for producing said product numbers in response to said summed logarithms produced by said adding means, said second addressable memory means including a plurality of addressable cells storing antilogarithms corresponding to the antilogarithms to said base B of the addresses thereof.

14. The system of claim 13 wherein said multiplier number and said multiplicand number have M and P bits, respectively, and wherein said selection of said base B is approximately given by $$B = \text{antilog}_{10} \{[1/(2^N-1)] \log_{10} [(2^M-1)(2^P-1)]\}.$$

15. In the system of claim 13 wherein said multiplier and said multiplicand numbers include a sign bit, said means including a second addressable memory further comprising first means to which said sign bits of said multiplier and said multiplicand numbers are applied for developing a sign bit of said product number, and means coupled to said second addressable memory means and to said first means for producing said product number including said sign bit thereof.

16. The system of claim 13 wherein the number of said plurality of addressable cells of said second addressable memory means corresponds to a portion of the range of possible magnitudes represented by said sums of the logarithms, and wherein said means including a second memory means further includes comparing means responsive to said sums of said logarithms for detecting the magnitudes thereof being outside of said portion of the range, and gating means for selectively producing said product numbers from values at the output of said second addressable memory means and a predetermined number in response to said detecting by said comparing means.

17. The system of claim 13 wherein said means including a second addressable memory further includes comparing means to which said multiplier and said multiplicand numbers are applied for detecting a zero magnitude thereof, and means coupled to said second addressable memory means and to said comparing means for producing said product numbers having zero magnitude in response to said detecting by said comparing means.

18. A digital signal processing system for multiplying a multiplier number and a multiplicand number, both of which are in a signed number format, to produce a signed product number comprising:
formatting means having an input to which numbers in said signed number format are applied and having an output at which corresponding unsigned magnitude numbers are produced;
first addressable memory means having an address input to which the output of said formatting means is coupled, having a plurality of addressable cells each storing an N-bit logarithm to the base B of the address thereof, and having an output at which the N-bit logarithms stored in said addressable cells addressed by said unsigned magnitude numbers are produced, wherein said base B is selected dependent on the possible values of said product numbers to utilize substantially the entire range of possible magnitudes of said N-bit logarithms; and said means for applying said multiplier and said multiplicand numbers to the input of said formatting means, whereby the logarithms to said base B thereof are produced at the output of said first addressable memory means;

adding means coupled to said first addressable memory means for adding said logarithms to said base B of said multiplier and said multiplicand numbers to produce logarithm sums;

second addressable memory means having an address input to which said adding means is coupled, having a plurality of addressable cells each storing an antilogarithm to said base B of the address thereof, and having an output at which the antilogarithms to said base B stored in said addressable cells addressed by said logarithm sums are produced;

signing means receiving sign indicating portions of said multiplier and said multiplicand numbers for developing a sign indication of said product number;

reformatting means having respective inputs to which said produced antilogarithms and said sign indication are applied for producing at an output thereof said signed product number; and detecting means having an input to which said multiplier and said multiplicand numbers are applied, and having an output for producing and indicating signal in response to either of said multiplier and multiplicand numbers having zero magnitude; and means coupled to said reformatting means and said detecting means for making said signed product number having zero magnitude in response to said indicating signal.

19. The apparatus of claim 18 wherein said means for applying sequentially applies said multiplier and said multiplicand numbers to the input of said formatting means, and wherein said adding means includes a digital adder having first and second inputs, and means receiving the sequence of logarithms corresponding to said multiplier and multiplicand numbers for applying said logarithms of said multiplier number and said logarithms of said multiplicand numbers to the first and second inputs, respectively, of said digital adder to develop said logarithm sum.

20. The system of claim 18 wherein the number of said plurality of addressable cells of said second addressble memory means corresponds to a portion of the range of possible magnitudes represented by said logarithm sum and wherein said second addressable memory means includes comparing means responsive to said logarithm sum for detecting the magnitudes thereof being outside of said portion of the range, and gating means for selectively producing said produced antilogarithm at the output of said second addressable memory means and a predetermined antilogarithm number in response to said detecting by said comparing means.

* * * * *

UNITED STATES PATENT AND TRADEMARK OFFICE
CERTIFICATE OF CORRECTION

PATENT NO. : 4,555,768

DATED : Nov. 26, 1985

INVENTOR(S) : Henry G. Lewis, Jr.; Thomas M. Stiller

It is certified that error appears in the above-identified patent and that said Letters Patent is hereby corrected as shown below:

First page, under "[57] ABSTRACT", line 2, "the" should be --be--.

| | |
|---|---|
| Column 3, line 38 | "75%" should be --77%--. |
| Column 7, line 56 | "inout" should be --input--. |
| Column 8, line 33 | "member" should be --number--. |
| Column 11, line 30 | "and", second occurrence thereof, should be --an--. |

Signed and Sealed this

Twentieth Day of May 1986

[SEAL]

Attest:

DONALD J. QUIGG

Attesting Officer

Commissioner of Patents and Trademarks